United States Patent Office 2,709,598
Patented May 31, 1955

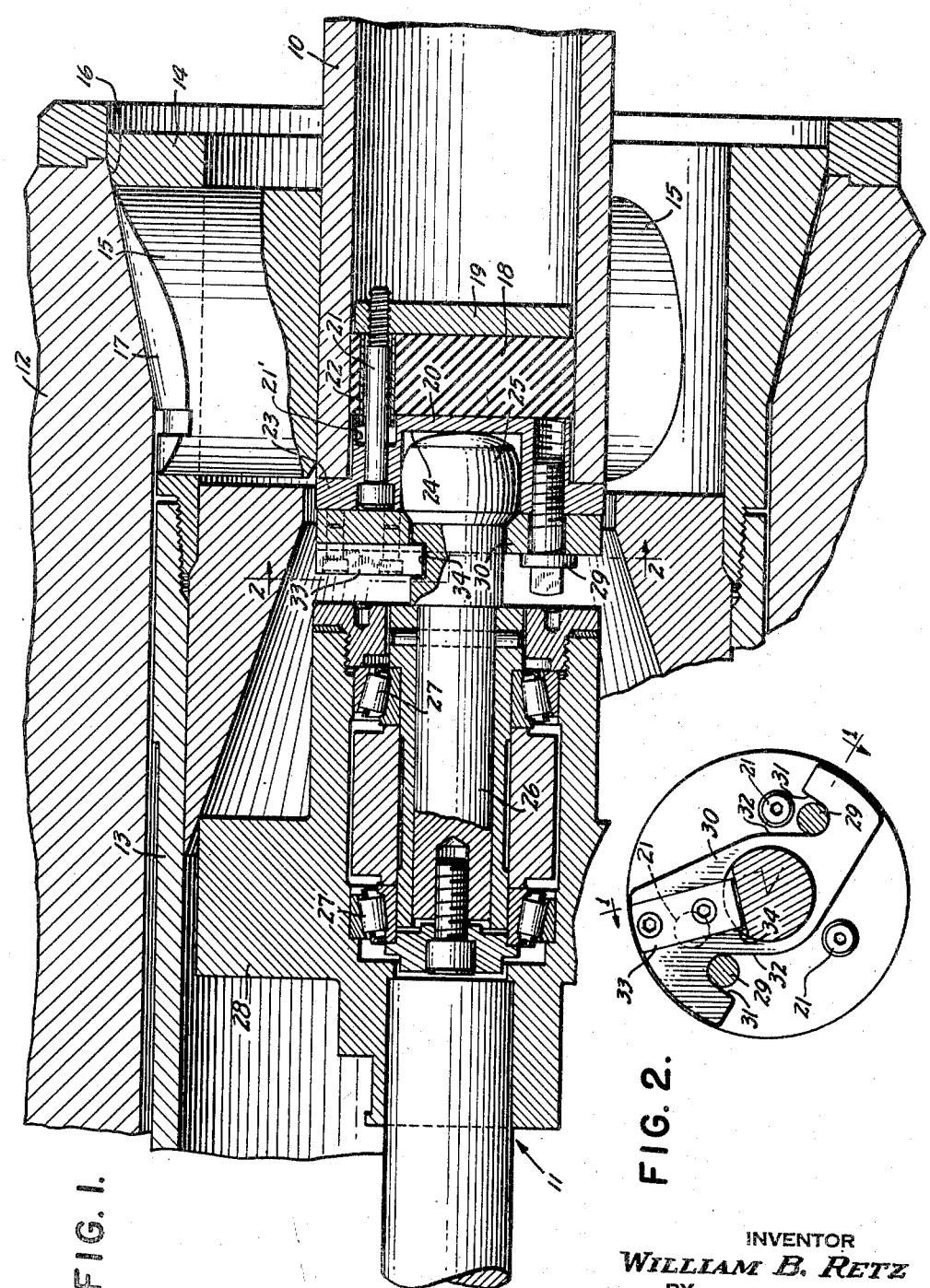

2,709,598

STOCK FEED MEANS

William B. Retz, Plainville, Conn., assignor to The New Britain Machine Company, New Britain, Conn., a corporation of Connecticut Application August 2, 1951, Serial No. 239,885

11 Claims. (Cl. 279—2)

My invention relates to stock-feeding means for a bar machine or the like, and in particular to an improved means for gripping a stock pusher to the stock. My invention is in the nature of an improvement over the construction disclosed in my Patent 2,623,267, issued December 30, 1952.

It is an object of the invention to provide an improved device of the character indicated.

It is another object to provide an improved means for chucking a stock-feeding head to a piece of stock.

It is a specific object to provide a means for eccentrically adjustably chucking a stock-feeding head to a piece of stock.

It is also a specific object to provide an improved and simple quick-releasing means for disengaging a chuck of the character indicated from a pusher mechanism.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Fig. 1 is a fragmentary longitudinal sectional view of a stock-gripping chuck and pusher means incorporating features of the invention, the parts being shown in a forwardly projecting position in which the stock is almost completely consumed and is supported in a spindle chuck, as on a lathe; and Fig. 2 is a sectional view, taken generally in the plane 2—2 of Fig. 1.

Briefly stated, my invention contemplates an improved means for quickly centering an internal-grip chuck at one end of a piece of tubular stock to be fed, as well as a relatively simple quick-release mechanism for disengaging the chuck from the stock-pusher means, whereby chucking may be effected independently of, and thus prior to, engagement to the pusher means. In the form to be described, the quick-release mechanism includes a bayonet-type engagement and means for retaining such engagement, once established.

Referring to the drawings, my invention is shown in application to the chucking of tubular stock 10 to be fed by pusher means 11 through a rotating spindle 12, as on a lathe or the like machine. The lathe may include its own chucking means for gripping the stock, and I have shown a so-called drawback-collet, including a collet tube 13, a collet holder 14, and a plurality of radially slidable collet jaws 15 guided and supported in the holder 14. The forward part of the spindle bore may have a conically tapered collet seat 16 to coact with the tapered seat 17 of the jaws 15. The stock 10 will be chucked in the spindle 12 when the tube 13 is drawn back (by means not shown) to drive all jaws 15 radially inwardly.

As indicated, my invention concerns improvements in the manner of attachment of the stock 10 to the pusher means 11. As in the case of the above-identified copending patent applications, such chucking means may include a resilient ring or disc 18, which may be of rubber-like material having an unstressed outer diameter in clearance relation with the bore of stock 10. The resilient element 18 may be sandwiched between relatively non-resilient pressure plates 19—20, which also preferably just clear the bore of the stock 10.

In accordance with a feature of the invention, centering alignment of the chucking means may be effected upon selective take-up of a plurality of angularly spaced securing members, such as bolts 21. The bolts 21 may be seated on the outer or rearwardly facing plate 20 and pass through guide tubes 22 in the resilient member 18 for threaded engagement in the inner plate 19. Counterbores 21' in member 20 may locatingly receive the guide tubes 22. It will be appreciated that, upon selective take-up of the bolts 21, the plate member 20 may be variously centered and aligned with respect to the axis of the tubular stock 10.

In accordance with a further feature of the invention, I provide a radially extending flange 23 at the rear end of the plate member 20, and the outer diameter of the particular flange 23 employed preferably coincides with the outer diameter of the particular stock 10. Thus, upon selective take-up of the securing means 21, and upon visual observation of the outer-diameter match between that of the flange 23 and that of the stock 10, securing may be effected with the rear-plate member 20 in sufficiently perfect alignment with the axis of stock 10.

For engagement with the pusher means 11, the plate 20 may be centrally recessed, as at 24, so as to receive an enlarged self-aligning head 25 forming part of the pusher means 11. In the form shown, the head 25 is at the projecting end of a rod 26 revolubly supported in antifriction bearing means 27 in a pusher casing 28. The pusher head 25 may be securely attached to the pusher casing 28 at all times during normal use and is shown held against axial movement with respect thereto, so that stock may be fed and unused butts retracted.

In accordance with the invention, I provide means for the relatively quick release of the pusher head 25 from the internal stock-chucking means. For quick release I prefer a bayonet engagement between the pusher means 25—26 and the stock chuck; that is, the rear member 20 thereof. In the form shown, I employ collar-head screws 29 at angularly spaced locations on the rear chuck plate 20, and a bayonet-locking plate 30 is carried and axially retained by the pusher means 25—26. The bayonet plate 30 may be angularly recessed, as at 31, to accommodate the respective shanks of collar-head bolts 29 upon relative rotation about the pusher axis. Radially inner faces or walls 32 of the recesses 31 may be gently inclined, as shown in Fig. 2, so as to promote a cam action in conjunction with the shanks of bolts 29, when setting the bayonet lock. Key means 33, carried by the bayonet plate 30, may coact with a transverse slot 34 in the pusher rod 26 to hold the bayonet-locking position.

In use, the parts 18—19—20—21—22—29 may form a sub-assembly, comprising all that is needed to set the chuck in the stock. These parts will first be longitudinally inserted in one end of the stock, and the securing bolts 21 will be escurely taken up in the manner which assures circumferential matching of the flange 23 to the outer diameter of the stock 10. The pusher head 25 will then be projected into the recess 24, and the bayonet-locking plate 30 swung or rotated until recesses 31 are engaged under the heads of collar-head bolts 29. Bolts 29 may then be secured. The assembly is held against dislodgment of the bayonet lock upon setting the key means 33 in the slot 34.

It will be appreciated that I have described a relatively simple chucking means, with a quick-release mechanism therefor. The chucking elements 22 may be provided in sufficient plurality for concurrent application to a plurality of pieces of stock, to be successively fed into the same machine, as in the case of a magazine-loaded automatic lathe. When the piece of stock to be fed drops into alignment with the spindle and therefore with the pusher means, it is a simple matter to drive the pusher head 25 into the recess 24 which has previously been axially aligned with the stock. The bayonet plate 30 may then be rotated and bolts 29 secured. Thereafter the key lock 33 may also be set. The entire operation need consume a minimum of the operator's time, resulting in a minimum down-time on the machine.

While I have described my invention in detail for the preferred form shown, it will be understood that modifications may be made within the scope of the invention, as defined in the appended claims.

I claim:

1. In a device of the character indicated for use in an intermittently operated stock-feeding mechanism, chucking means for gripping a piece of stock and including a resilient chucking ring and axially displaceable means for compressing said ring for a radially directed grip upon the stock, means for attachment of said chucking means to a pusher head including mounting means carried by said chucking means, a pusher member for releasable attachment to said chucking means, said pusher member including bayonet-locking means axially engageable with said mounting means upon a relative rotation of said mounting means and of said bayonet-locking means, said bayonet-locking means having an action independent of the action of said chucking means, whereby said chucking means may grip stock while said bayonet-locking means is engaged, and locking means independent of the bayonet engagement and locking said mounting means and said bayonet-locking means against relative angular movement when in bayonet-locking engagement.

2. In a device of the character indicated, an internally expanding chuck for tubular stock, adjustable centering means for adjustably centering said chuck with respect to the stock and for securing an adjustably centered setting, pusher means for said chuck, and quick-releasing axially engageable means including bayonet-locking means on said pusher means and on said chuck.

3. In a device of the character indicated, an internally expanding chuck for tubular stock, means for centering said chuck with respect to the stock and for securing a centered setting, pusher means for said chuck and including an enlarged head on a pusher rod, quick-releasing securing means including angularly spaced axially extending bolts carried by said chuck, and a bayonet-locking plate carried by said rod and retained by said head and including means engageable with said bolts upon angular rotation.

4. A device according to claim 3, in which releasable locking means engage said bayonet plate and said pusher rod against relative angular movement after the bayonet lock has been set.

5. A device according to claim 3, in which said enlarged head is generally ball-shaped, whereby axial-alignment differences between said pusher means and said chuck need not impair the efficacy of said quick-releasing securing means.

6. In a chuck device of the character indicated, two relatively rigid plates of a diameter to clear the bore of stock to be chucked, one of said plates including a flange of outer dimensions exceeding the inside diameter of stock to be chucked, a circumferentially continuous resilient disc of rubber-like material between said plates, and a plurality of bolts angularly spaced about the axes of said plates and seated on one of said plates and extending wholly through the body of said resilient disc and threadedly engaged in the other of said plates, said bolts providing the only means of connection between said plates, and said bolts, each being independently circumferentially continuously surrounded by the body of said resilient disc, whereby, upon the selective take-up of said bolts, one may not only secure the chuck in the bore of stock but may also axially align one of said plates with the stock.

7. In a chuck device of the character indicated, two relatively rigid plates of a diameter to clear the bore of stock to be chucked, a circumferentially continuous resilient disc of rubber-like material between said plates, and a plurality of bolts angularly spaced about the axes of said plates and seated on one of said plates and extending wholly through the body of said resilient disc and threadedly engaged in the other of said plates, said bolts providing the only means of connection between said plates, and said bolts each being independently circumferentially continuously surrounded by the body of said resilient disc, one of said plates having an outwardly facing radial flange of outer diameter to match the outer diameter of stock to be chucked, whereby, upon selective take-up of said bolts in securing said chuck, one may observe the centered alignment of said flanged plate by noting the match of the outer diameter of said flange with the outer diameter of the stock.

8. In a chuck device of the character indicated, two relatively rigid plates of a diameter to clear the bore of stock to be chucked, a circumferentially continuous resilient disc of rubber-like material between said plates, and a plurality of bolts angularly spaced about the axes of said plates and seated on one of said plates and extending wholly through the body of said resilient disc and threadedly engaged in the other of said plates, said bolts providing the only means of connection between said plates, and said bolts each being independently circumferentially continuously surrounded by the body of said resilient disc, whereby, upon the selective take-up of said bolts, one may not only secure the chuck in the bore of stock but may also axially orient one of said plates with respect to the stock, one of said plates having a central recess to receive a stock-pusher head, and a plurality of angularly spaced bayonet-locking means for quick-releasing engagement with bayonet-locking means carried by the pusher head.

9. In a chuck device of the character indicated, two relatively rigid plates of a diameter to clear the bore of stock to be chucked, a resilient disc between said plates, a plurality of angularly-spaced bolts seated on one of said plates and extending through said resilient disc and threadedly engaged in the other of said plates, whereby, upon the selective take-up of said bolts, one may not only secure the chuck in the bore of stock but may also axially align one of said plates with the stock, and relatively rigid guide sleeves embracing parts of the shanks of said bolts in said resilient disc, said sleeves being slidably guided in counterbores in one of said plates.

10. In a chuck device of the character indicated, two relatively rigid plates of a diameter to clear the bore of stock to be chucked, a yieldable disc of rubber-like material between said plates, a plurality of bolts angularly spaced about the axes of said plates and seated in one of said plates and extending wholly through the body of said resilient disc and threadedly engaged in the other of said plates, said bolts providing the only means of connection between said plates, and said bolts each being independently circumferentially continuously surrounded by the body of said resilient disc, whereby, upon the selective take-up of said bolts, one may not only secure the chuck in the bore of stock but may also axially align one of said plates with respect to the axis of a chucked piece of stock, and relatively rigid guide sleeves embracing the full length of those parts of the shanks of said bolts as are contained within the body of said resilient disc.

11. In a chuck device of the character indicated, two relatively rigid plates of a diameter to clear the bore of stock to be chucked, a solid circumferentially continuous cylindrical resilient disc of rubber-like material between said plates, and three independently-adjustable tie-bolts spaced about the axes of said plates and passing each independently through the otherwise solid body of said resilient disc and constituting the only means connecting said plates to each other, the volume within the outer confines of said disc being solidly and completely filled by said rubber-like material and by said tie-bolts, whereby, upon selective take-up of said bolts, not only may one secure the chuck in the bore of stock but one may also adjust the relative axial alignment of said plates.

References Cited in the file of this patent

UNITED STATES PATENTS

| | | |
|---|---|---|
| 163,217 | Lawson | May 11, 1875 |
| 436,223 | Evely | Sept. 9, 1890 |
| 2,187,090 | Martin | Jan. 16, 1940 |
| 2,426,200 | Green | Aug. 26, 1947 |
| 2,466,974 | Stupakoff et al. | Apr. 12, 1949 |
| 2,623,267 | Retz | Dec. 30, 1952 |

FOREIGN PATENTS

| | | |
|---|---|---|
| 5,084 | Great Britain | Oct. 25, 1883 |